(12) United States Patent
Reichel et al.

(10) Patent No.: US 10,919,102 B2
(45) Date of Patent: Feb. 16, 2021

(54) JOINING CONNECTION AND METHOD FOR WELDING TORCH COMPONENTS

(71) Applicant: Alexander Binzel Schweisstechnik GmbH & Co. KG, Buseck (DE)

(72) Inventors: Albrecht Reichel, Dresden (DE); Marco Böhme, Dresden (DE); Bert Kämmerer, Dresden (DE)

(73) Assignee: ALEXANDER BINZEL SCHWEISSTECHNIK GMBH & CO. KG, Buseck (DE)

( * ) Notice: Subject to any disclaimer, the term of this patent is extended or adjusted under 35 U.S.C. 154(b) by 555 days.

(21) Appl. No.: 15/619,710

(22) Filed: Jun. 12, 2017

(65) Prior Publication Data
US 2017/0355039 A1    Dec. 14, 2017

(30) Foreign Application Priority Data

Jun. 13, 2016 (DE) .................. 10 2016 110 769

(51) Int. Cl.
| | |
|---|---|
| *B23K 9/32* | (2006.01) |
| *F16L 13/14* | (2006.01) |
| *F23D 14/46* | (2006.01) |
| *B23K 9/29* | (2006.01) |
| *B23P 11/02* | (2006.01) |

(52) U.S. Cl.
CPC .............. *B23K 9/32* (2013.01); *B23K 9/291* (2013.01); *B23K 9/325* (2013.01); *B23P 11/02* (2013.01); *F23D 14/465* (2013.01)

(58) Field of Classification Search
CPC ...... F16L 12/142; F16L 33/207; B23K 20/16; B23K 9/32
See application file for complete search history.

(56) References Cited

U.S. PATENT DOCUMENTS

| | | | |
|---|---|---|---|
| 1,678,640 A | 7/1928 | Hall | |
| 1,924,712 A * | 8/1933 | Eisenman | F16L 33/207 285/256 |

(Continued)

FOREIGN PATENT DOCUMENTS

| | | |
|---|---|---|
| DE | 8909844 | 9/1989 |
| DE | 4313831 | 4/1994 |

(Continued)

OTHER PUBLICATIONS

"Formschlussunterstützung bei Pressverbindungen" (kunststoffe.de Nov. 12, 2006).

*Primary Examiner* — Dana Ross
*Assistant Examiner* — Lawrence H Samuels
(74) *Attorney, Agent, or Firm* — Warner Norcross + Judd LLP

(57) ABSTRACT

The present invention concerns a joined connection and a joining method for welding torch components with a first metallic tubular segment and a second metallic tubular segment, which are joined to each other by plastic deformation via an interlocking connection. The problem which the invention proposes to solve is to indicate a joined connection as well as a joining method in which two metallic welding torch components can be joined without the use of thermal joining methods, yet with comparable quality. The problem is solved in that the interlocking is formed in at least two directions of the joining surface bordering one another.

10 Claims, 2 Drawing Sheets

(56) References Cited

U.S. PATENT DOCUMENTS

Figure 1:
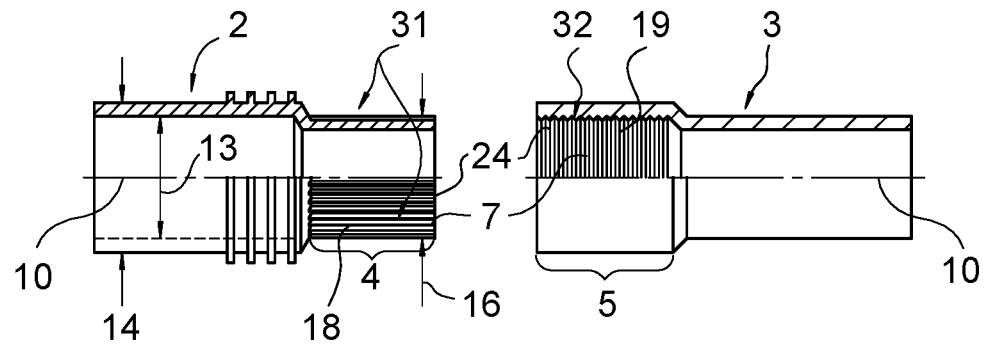

| | | | | | |
|---|---|---|---|---|---|
| 2,535,460 | A | * | 12/1950 | Rotter | F16L 33/2073 285/222.4 |
| 3,160,949 | A | * | 12/1964 | Bussey | B21D 39/04 29/421.1 |
| 3,363,680 | A | * | 1/1968 | Baker | F28D 7/005 165/158 |
| 3,477,750 | A | * | 11/1969 | Powell | B21D 39/04 285/363 |
| 3,783,233 | A | * | 1/1974 | dal Molin | B23K 9/291 219/137.61 |
| 8,925,978 | B2 | * | 1/2015 | Jamison | F16L 17/02 285/382 |
| 2006/0071469 | A1 | | 4/2006 | Romanelli | F16L 33/2076 285/256 |
| 2007/0284353 | A1 | * | 12/2007 | Laymon | B23K 9/293 219/137.31 |
| 2010/0139077 | A1 | * | 6/2010 | Linzell | F16L 37/02 29/525 |
| 2010/0314865 | A1 | * | 12/2010 | Hatton | B23P 11/025 285/187 |
| 2012/0315082 | A1 | * | 12/2012 | Linzell | B23K 20/021 403/270 |
| 2014/0197633 | A1 | * | 7/2014 | Nixon | F16L 13/142 285/343 |
| 2014/0300107 | A1 | * | 10/2014 | Altenrath | F16L 13/142 285/382.7 |
| 2015/0226356 | A1 | * | 8/2015 | Kury | F16L 33/2076 285/256 |
| 2016/0131287 | A1 | * | 5/2016 | Cloos | F16L 13/143 285/337 |

FOREIGN PATENT DOCUMENTS

| | | |
|---|---|---|
| DE | 19815244 | 10/1999 |
| DE | 202013102979 | 7/2013 |
| EP | 2213402 | 8/2010 |
| EP | 2603345 | 11/2013 |
| EP | 2366485 | 12/2013 |
| EP | 2026928 | 10/2014 |
| GB | 621254 | 4/1949 |
| GB | 2306594 | 5/1997 |
| WO | 9930863 | 6/1999 |
| WO | 2004026518 | 4/2004 |
| WO | 2009092125 | 7/2009 |
| WO | 2010060128 | 6/2010 |
| WO | 2011153560 | 12/2011 |
| WO | 2014047665 | 4/2014 |

* cited by examiner

JOINING CONNECTION AND METHOD FOR WELDING TORCH COMPONENTS

The invention concerns a joined connection for welding torch components according to the preamble of claim 1 as well as a joining method according to the preamble of claim 15.

PRIOR ART

Welding torch necks usually consist principally of an inner tube with connections at the ends, an insulating material enclosing the inner tube, such as a hose, tube, or wound insulating strips, and often an outer tube again with connections at the end face and protection the insulation.

These connections are in part not detachable and they are joined by means of brazing. The drawbacks associated with brazing consist in that the materials near the brazing site are often weakened by the brazing process. During the brazing process, heat is introduced into the brazing site, which may weaken the material at the brazing site if the material is soft annealed, and undergoes unwanted changes in quality due to going beyond the recrystallization temperature of the material, such as in the case of steel, or by recrystallization, such as in the case of copper and aluminum alloys.

In order to reduce the input of heat at the brazing site, low-melting solder is used, such as silver solder. The use of such solders increases the costs of the joined connection. Moreover, the parts joined in this manner are pickled in a costly and environmentally harmful manner after the brazing, so that unwanted tarnishing and discoloration may occur depending on the quality of the pickling bath.

The input of heat during the brazing process may also sacrifice the fit between the joined parts and may cause an unwanted warping of the components. Furthermore, it may happen that brazed seams become visible and solder penetrates into interior spaces. This may result in unwanted departures in surface quality and disruptive contours of the components being joined.

Nonetheless, in current practice the brazing method has been widely adopted for the joining of welding torch components as compared to alternative methods, since it offers decisive advantages. These advantages include, for example, a bonded material connection of the parts in the smallest space, the possibility of joining together different kinds of material, the attaining of high mechanical strength of the joined connection, permanent gas tightness and water tightness, good electrical conductivity and good thermal conductivity in dependence on the conductivity of the solder. Moreover, the strength of the joined connection can be influenced, for example by the length of the overlapping, and the brazed site does not need to be directly accessible. With such a "hidden brazing site" a tolerance equalization between the joined pieces is possible.

On account of the good electrical conductivity, the good thermal conduction and the sufficient mechanical strength, copper and brass alloys are used chiefly on the inner tube of the torch neck and brass, aluminum and steel alloys are used chiefly at the outer tube of welding torches.

Basically, the non-detachable joined connections especially at the welding torch neck have a requirement profile, depending on their position and function, whereby gas tightness, water tightness, and low weight need to be assured in the smallest space. Furthermore, high tensile, shear and impact strength, high bending rigidity and torsional strength are required. In regard to electrical properties, such joined connections basically require a low electrical resistance under large welding currents, as well as slight resistive heating. From a thermal standpoint, low heat transfer resistances and good resistivity of the joined connection to loosening due to thermal expansion and material flow are required. Furthermore, a tightness to penetration of pickling solution and oxygen of air into the welding torch must be successfully prevented by the joined connection and no loosening of the joined site upon bending of the torch neck must occur.

In the context of the aforementioned drawbacks of brazing, fulfillment of the above represented requirement profile leads to high costs, long fabrication times, as well as drawbacks in the use of the torch. Thermal methods such as fusion welding, friction welding, and shrink pressing are likewise undesirable. Neither are bonding methods used on account of inadequate electrical and thermal conductivity, thermal instability and high manufacturing costs due to the costly preparation of the bonding surfaces.

In practice, pressing/embossing methods and threaded connections are also used for joining the segments of a welding torch neck, wherein problems with strength or loosening occur on account of the unfavorable combination of soft and hard materials, and the required structural space is increased. In the case of threaded connections, as a rule only the first turns of the thread bear the mechanical loading, so that such connections have a tendency to fracture or flowing of the material. In the case of pressed connections of smooth surfaces, but also those with interlocking by a polygonal form of a pressing surface, due to the required intense deformation of the parts there is often an exceeding of the permissible surface pressure and thus a flowing of the soft material due to uneven distribution of the force applied to the pressing surface regions and thus an unwanted weakening of the material, as well as the entire joined connection.

DE 20 2013 102 979 U1 discloses a welding torch for electric arc, inert gas welding and a contact tube for such a welding torch. In particular, a detachable connection between a contact tube and a contact tube holder is disclosed, which can be replaced with a few manual operations.

From DE 43 13 831 C1 there is known a connection for an electrical, water, or electrical-gas cable of an arc welding or cutting device, in which a connection piece and an end piece are firmly joined together by means of extrusion. Flow grooves are provided on the connection piece, into which the softer metallic material of the end piece may flow during the extrusion process. This extruded connection has the drawback that the components joined together are only secured by virtue of friction and thus are inadequately protected against torsion. Therefore, the extruded connection may become loosened during use.

WO 2009/092125 A1 discloses a detachable fastening of a gas nozzle, wherein a gas nozzle seat can be fastened to a pipe elbow by a press fit.

WO 2004/026518 A2 discloses a quick release for a gas nozzle in a welding torch, wherein a gas nozzle is connected to a welding torch in detachable and sealed manner.

EP 2 213 402 A1 discloses a torch for tungsten/inert gas welding with an electrode unit which is detachably held in the torch by means of a press fit.

GB 2 306 594 A as well as GB 621,254 pertain to detachable pipe connections for a turbine engine as well as for a vacuum cleaner in which elastic materials are inserted between the two tubular members of the joint.

Furthermore, it is known from welding torch engineering how to provide embossed matings, for example in gas nozzles, in which nonmetallic insulation is introduced between two metallic joint members and firmly connected to them by a joined connection.

Starting from the above described drawbacks, the problem which the invention proposes to solve is to indicate a joined connection as well as a joining method in which two metallic welding torch components can be joined without the use of thermal joining methods, yet with comparable quality.

This problem is solved with a joined connection according to claim 1 as well as a joining method according to claim 15.

According to the invention per claim 1, a joined connection is provided between a first and a second metallic tubular segment of a welding torch. In particular, the two tubular segments may be parts of a welding torch neck. The first tubular segment has a joining section extending in the axial direction, which is received at least partly in a corresponding joining section of the second tubular segment. The two tubular segments overlap in a joining area of the joined connection by their joining sections. At least the first tubular segment has, in the nonjoined state at least on one joining surface of its joining section, a surface structure with indentations incorporated into its surface. In the joined state, these indentations by virtue of a plastic deformation of the second tubular segment occurring during the joining process are filled at least partly with material of the second tubular segment such that the two components engage with each other by interlocking. The invention is characterized in that the interlocking between the first tubular segment and the second tubular segment is formed in at least two directions of the joining surface bordering one another.

The fundamental notion of the invention is that, by interflowing of the surface structures at the joining surfaces, an interlocking is produced, which acts in several directions of the joining surface of the respective segment. In this way, a nondetachable connection is produced, which is comparable in terms of mechanical stability and long-term stability as well as tightness to a brazed connection, yet it can be produced much more easily. Surprisingly, it has been found that the invention can produce properties of electrical and thermal conductivity as well as mechanical strength, especially for the pull-off strength of the first segment relative to the second segment, which are for the most part the equivalent of a brazed connection.

According to one embodiment of the invention, it may be provided that the two tubular segments lie against one another by an additionally radially acting force closure. In this, besides the plastic deformation of the material of the respective segment, the intrinsic elastic tension of the material is also utilized, which during the joining process at first results in an elastic deformation of at least one segment in the joining section before the plastic deformation begins. After plastic deformation has occurred, the elastic restoration of the material has the effect that the joining surfaces lie against each other permanently under a spring biasing and thus the joined connection remains permanently firm.

The invention can moreover make sure that the first tubular segment is joined together with the second tubular segment by interlocking in the joining area both against a force acting in the axial direction and against a force acting in the rotary direction. In the embossed interlocking connections known thus far, where usually radially encircling grooves are filled with the material of a component fastened by forced flow, it was known how to prevent by an interlocking an axial pulling off of the one tubular segment from the other tubular segment. A twisting of the components relative to each other was prevented heretofore only by a radial force closure based on friction, which has proven to be not sufficiently reliable. The invention eliminates this deficiency in that the interlocking present in the joined connection between the joining surfaces of the two tubular segments acts against a force acting in the rotary direction, i.e., a torque or a force component running transversely on the joining surface to the axial direction of the tubular segments. It has been found that in this way the lifetime and the mechanical properties of the joined connection can be improved.

According to another embodiment of the invention, it may be provided that both the first tubular segment and the second tubular segment in the nonjoined state is provided with a surface structure at the joining surface in the respective joining section. This has the surprising effect that an interlocking in all directions of the surface is produced by an interflowing of the respective surface structures. For example, the peaks or elevations of structures are pressed against each other and become mutually deformed. This produces a many-point interlocking and force closure, which has proven to be especially reliable in the context of the—joined connections for welding torches. Moreover, it has been found that an especially good force transfer from the one tubular segment to the other tubular segment may occur, since a uniform force distribution in a small space and with high strength is accomplished in the joining area. Thanks to the multiple deformation of the surface structures, a clasping or intermeshing of the individual deformed structures occurs, so that the interlocking achieves an especially large strength due to the creating of many shear surfaces. The tubular segments used for the welding torch and especially a welding torch neck undergo many bending loads and also loads to resist twisting during their use. The distribution of the interlocking over the joining section favors such a force transmission, especially when alternating loads are present.

According to another embodiment of the invention, it may be provided that the surface structure at the joining surface has at least one elevation and/or indentation, preferably several elevations and/or indentations, which are arranged in particular at uniform distances from each other over the joining surface.

In this way, the aforementioned uniform force distribution within the joined connection can be achieved. Moreover, such surface structures are easy to produce.

According to a particular embodiment of the invention, it may be provided that the surface structure is present as a knurling, cross knurling, thread or groove structure or as a combination of these. In this way, a uniform distribution of elevations and indentations can be produced by using already existing tools.

According to another embodiment of the invention, it may be provided that the surface structures on the joining surfaces of the first and/or second tubular segment run at an angle to each other, preferably at an angle of 30° to 90°. Such an embodiment has proven to be especially favorable for the joined connection according to the invention. In particular, a groove or thread structure may be worked into the joining surfaces, the groove or thread structure on the one tubular segment running opposite the other segment, so that after the joining is done the corresponding angle results. Depending on the setting of the angle, the joined connection can furthermore be formed more resistant to a twisting or more resistant to an axial pulling off of the two tubular segments from each other, depending on how the surface structure is oriented in relation to the axial direction of the joined connection. For example, if oppositely formed threads are provided at a relatively shallow angle to the axial direction of the joined connection on the two tubular segments, the resistance of the joined connection to an axial pulling off will be increased.

According to another embodiment of the invention, it may be provided that the surface structure at the joining surface of one or both tubular segments extends parallel to the axial direction or at an angle less than or equal to 45°, preferably less than 45°, and the surface structure on the joining surface of the other tubular segment extends transversely to the axial direction or at an angle larger than or equal to 45°. In this way, the angle at which the surface structures of the two tubular segments run relative to each other can be set to a desired degree, in order on the one hand to set the properties of the joined connections in regard to a twisting or axial pulling off and on the other hand to adapt the surface structure to the existing loading conditions of the respective tubular segment.

For this, it may be provided in particular that the surface structure for the tubular segment designed for a larger maximum bending load extends parallel to the axial direction or at an angle less than 45°. In this way, any notch effects produced on the component by the surface structure may be reduced and thus the long-term strength of the joined connection can be improved.

According to another embodiment of the invention, it may be provided that the two tubular segments have different material strength. In this way, the interflowing of the surface structures may be better adjusted and controlled. Moreover, each time a different material will be used for the particular segment for different functions on a welding torch. Thus, this constitutes a combination of two benefits.

According to another embodiment of the invention, it may be provided that the first and/or the second tubular segment are rotationally symmetrical at least in their joining section. In particular, this pertains to the joining surfaces, that is, the surface of the respective tubular segment which comes in contact with the other tubular segment when the joined connection is produced. A rotationally symmetrical design is especially well suited to the making of a liquid or gas-tight joined connection. The other portion of the tubular segment may also be rotationally symmetrical in the joining area.

According to another embodiment of the invention, it may be provided that at least one elastically biased support ring is provided at the joining section, which biases the associated tubular segment at least in the joining section into the joined position. Especially when using plastically deformable but elastically rather inflexible materials for the tubular segment—such as copper alloys and/or aluminum alloys—and also when using relatively thin wall thicknesses, an additional support ring can permanently maintain the elastic biasing of the joining sections in the joined position. It may be provided that at least one support ring is provided both on the inside of the joined connection and on the outside of the joined connection. The support rings press the material of the respective tubular segments against each other in the joining section, so that a permanent strength of the joined connection is assured.

According to another embodiment of the invention, it may be provided that one support ring is arranged on an inner wall of the first tubular segment and/or one support ring is provided on the outer wall of the second tubular segment in order to achieve the aforementioned advantages.

It may furthermore be provided that a closed surface structure, especially a closed toothed ring, is provided at one edge of the joining area, which in the joined state forms a gas or water-tight boundary, while the closed surface structure is provided in particular on the tubular segment which has a harder material than the other tubular segment. In this way, a fluid-tight connection of the two tubular segments can be achieved especially easily. The surface structure provided on the harder component acts as a kind of cutting ring, which cuts a sealing surface into the softer material of the second tubular segment.

According to claim 15 of the invention, furthermore a joining method is proposed for the connecting of a first tubular segment to a second tubular segment, wherein the tubular segments are preferably welding torch components, especially according to one of claims 1 to 14. In the joining method at first a surface structure with indentations is produced in a joining section of the first tubular segment in order to produce a joining surface. Then the first tubular segment is brought into axial overlapping with the second tubular segment at least in the area of the joining sections of the two tubular segments. After this, at least one of the two segments is plastically deformed in order to produce an interlocking connection in the area of the joining sections so that the indentations in the joining section are at least partly filled with material of the second tubular segment, so that the resulting interlocking is formed in at least two directions of the joining surfaces bordering each other. By the application of the joining method according to the invention, a mechanically stable and permanent fluid-tight joined connection can be achieved.

The joining method according to the invention may provide a plastic deformation outwardly in the radial direction or against the radial direction inwardly or both outwardly in the radial direction and inwardly against the radial direction. In particular, the plastic deformation can be done by one or more of the following methods:
a) hydroforming or
b) axial impressing with a drawing mandrel
c) shoving together of wedge-shaped, expanding elements
d) point pressing from inside to outside under rotation of the pipes
e) pressing or embossing By "tubular" in the context of the invention is meant a suitable formation of the respective segment for the conveying of a fluid through it. The cross section of a tubular segment may preferably be circular. Other enclosed cross sections are also conceivable in the context of the invention.

PRESENTATION OF THE INVENTION

Further goals, benefits, features and application possibilities of the present invention will emerge from the following description of a sample embodiment with the help of the drawing. All described and/or graphically depicted features in themselves or in any meaningful combination constitute the subject matter of the present invention, even independently of their inclusion in the claims or their referral to the claims.

Figure 2:
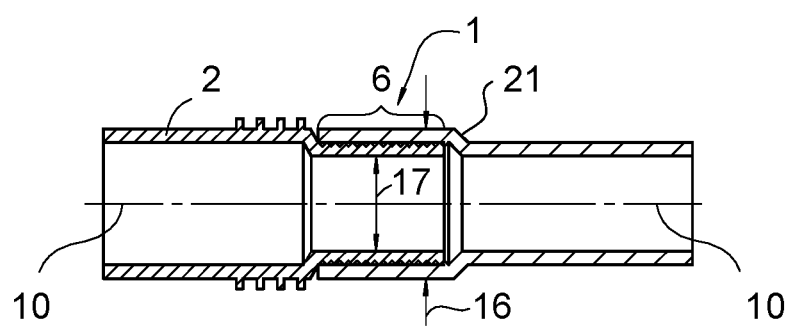
Figure 3:
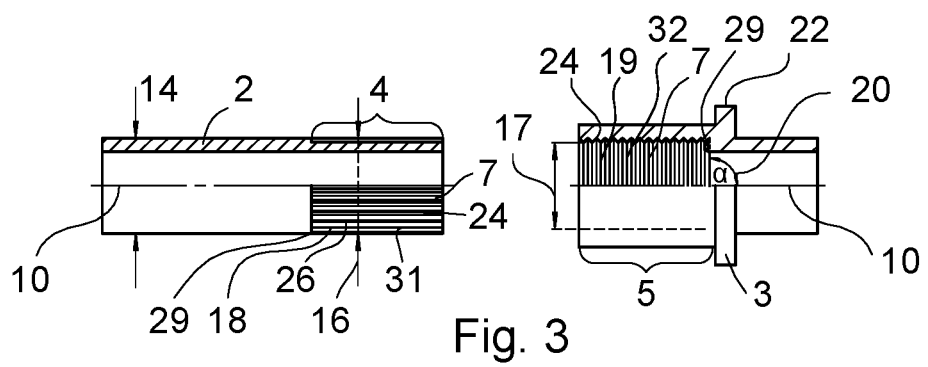
Figure 4:
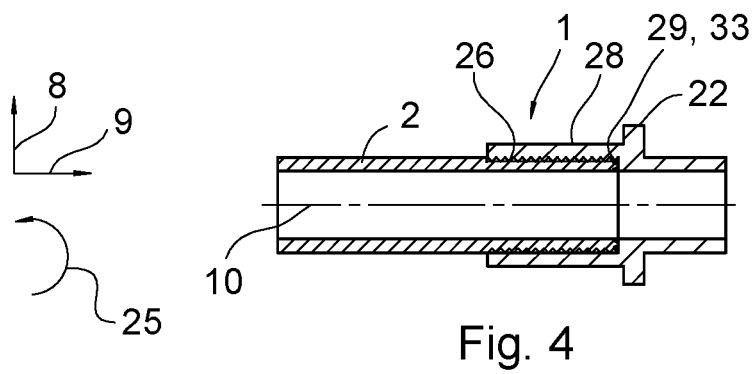
Figure 5:
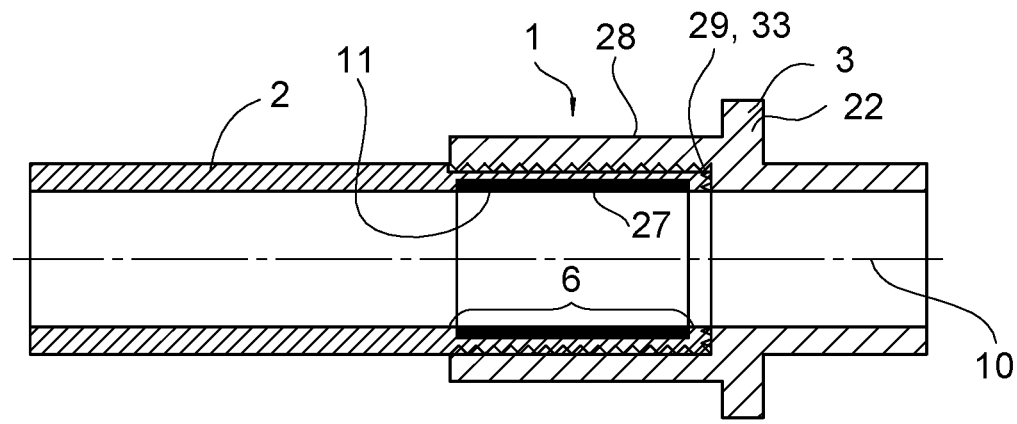
Figure 6:
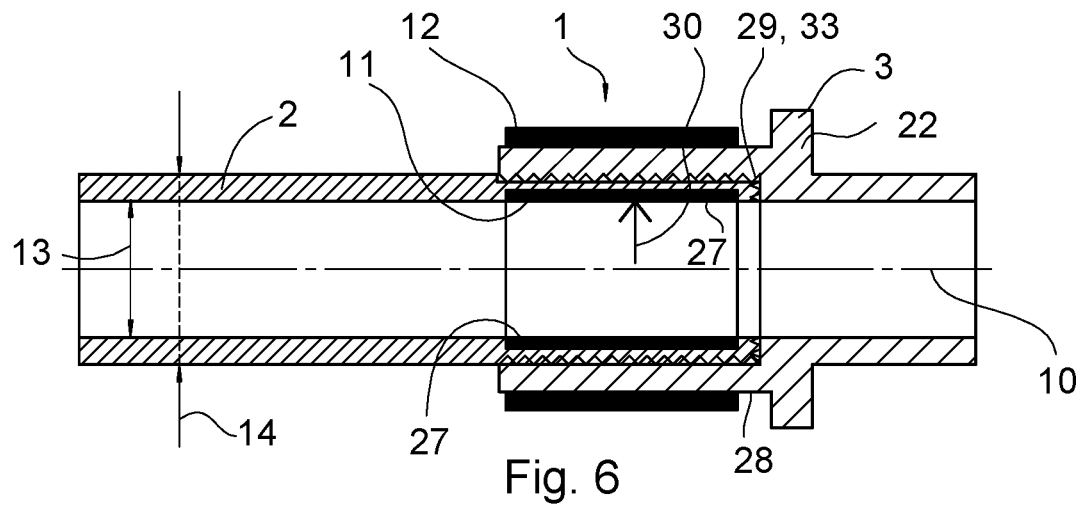
Figure 7:
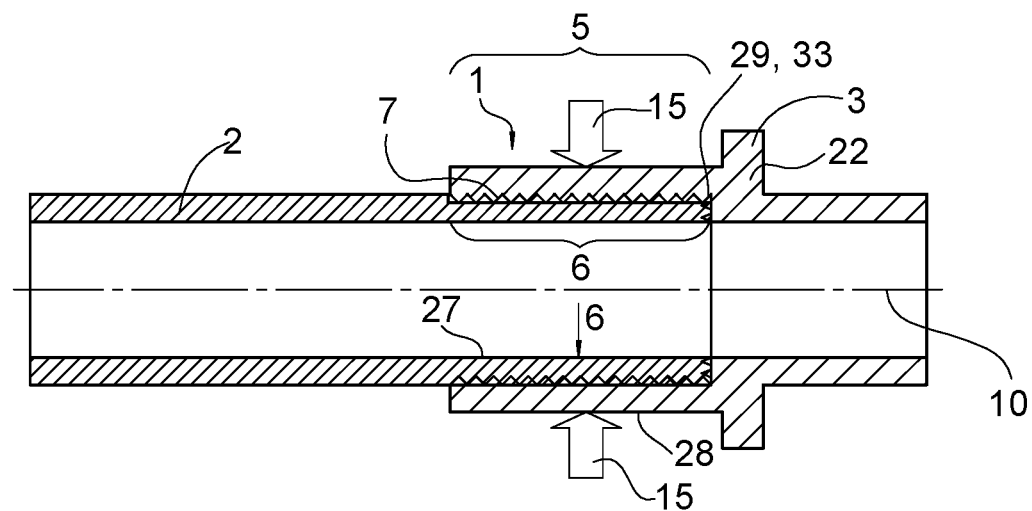

There are shown, in part schematically:

FIG. 1, a schematic, partly sectioned side view of the tubular segments prior to the joining process, FIG. 2, a schematic representation of the joined connection, FIG. 3, an alternative embodiment with two different tubular segments, FIG. 4, a joined connection according to the embodiment of FIG. 3, FIG. 5, an alternative joined connection with an interior support ring, FIG. 6, another alternative joined connection with interior and exterior support ring and FIG. 7, a representation of the joining method.

The same or equivalent acting parts are provided with reference numbers in the following represented figures of the drawing by means of one embodiment for better legibility.

FIG. 1 shows a first tubular segment 2 as well as a second tubular segment 3, each of which has a joining section 4, 5. The joining section 4 of the first tubular segment 2 is formed as a "male part", so as to be introduced as shown in FIG. 2 into the "female" joining section 5 of the second tubular segment 3 and be received therein. The joining sections 4, 5 of the two tubular segments 2, 3 overlap each other in the joining area 6, in which the joined connection 1 is constructed.

Inside the joining section 4, a surface structure 7 in the form of longitudinal grooves 18 is produced on the outer surface, that is, the first joining surface 31, which extend along a first axial direction 8 on the joining surface 31. These indentations 24 may be produced for example as a knurling in the joining surface 31.

In FIG. 1, there is shown likewise a row of indentations 24 for the second tubular segment 3 on a joining surface 32 in the joining section 5, which extend as transverse grooves 19 transversely to the longitudinal axis 10 of the tubular segments 2, 3. In the present example, the indentations 24 thus extend at an angle 20 of around 90° to the axial direction 8, i.e., in a second sloping direction 9 with respect to the joining surface 32.

The first tubular segment 2 is provided as the component which undergoes greater bending loads during the use of the welding torch. Thanks to the longitudinal grooves 18 oriented in the axial direction 8, a notch effect from the surface structure 7 on the joining surface 31 is prevented.

The inner diameter 17 in the joining section 4 of the tubular segment 2 is smaller than the inner diameter 13 outside the joining area. Likewise, the outer diameter 14 of the tubular segment 2 outside the joining section 4 is larger than the outer diameter 16 in the joining section 4. In the case of the second tubular segment 3 the proportions are reversed, so that a step 21 is formed along a longitudinal axis 10.

In the alternative embodiment of FIGS. 3 and 4, the outer diameter 16 of the tubular segment 2 is roughly identical to the outer diameter 14 outside the joining area 4. The same holds for the respective inner diameters 13 and 17. The second tubular segment 3 per FIG. 3 has in the joining section 5 a larger outer diameter 16 as well as a larger inner diameter 17, so that the joining section 4 can be received therein. Thus, a continually roughly constant inner diameter 13 can be provided at the joined connection 1 as compared to the sections of the tubular segments 2, 3 not belonging to the joined connection 1.

In the sample embodiment of FIGS. 3 and 4, the surface structure 7 is formed in the same way as in the first sample embodiment of FIGS. 1 and 2. The transverse grooves 19 may be understood here as being radially encircling and closed grooves. But the transverse grooves may also be formed as threads or as a knurling.

FIG. 5 shows another embodiment in which the elastic biasing of the first tubular segment 2 in the joining area 6 is maintained by means of a support ring 11 arranged on the inner wall 27 of the tubular segment 2. The support ring 11 consists of a material which has greater elasticity than the material of the first tubular segment 2 and thus maintains an elastic biasing in the direction of the second tubular segment 3.

In the embodiment of FIG. 6, in addition to an inner support ring 11 there is also provided an outer support ring 12 on the outer wall 28 of the second tubular segment 3, which also biases the material of the second tubular segment 3 in the radial direction 30 or against the radial direction 30.

FIGS. 3 to 7 furthermore show an encircling surface structure 7 at the edge 29 of a shoulder 22, which ensures a fluid tightness of the joined connection 1. This surface structure 7 at the edge 29 acts as a kind of cutting ring, the material of the second tubular segment 3 being harder than the material of the first tubular segment 2, so that the surface structure 9 formed at the edge 29 cuts into the first tubular segment 2 during the joining process and thus produces a sealing surface 33.

FIG. 7 shows schematically the joining process, in which a deforming force 15 acting here on the outside in the joining area 6 in the radial direction 30 plastically deforms the second tubular segment 3 in the joining section 5, so that the surface structures 7 of the two tubular segments 2, 3 flow into each other. The deforming force 15 may likewise act outwardly from the inside. It is furthermore possible for deforming forces to act outwardly from the inside and inwardly from the outside at the same time.

The interlocking joined connection formed in this way is especially resistant to forces in a rotation direction 25 and at the same time in the axial direction 8. The surface structures with the indentations 24 and elevations 26 provided on the joining surfaces 31, 32 are plastically deformed by the forces exerted during the joining method, so that the elevations 26 and indentations 24 flowing into each other form multiple shear surfaces making possible a uniform force transmission over the entire joining area 6.

LIST OF REFERENCE NUMBERS

1 Joined connection
2 First tubular segment
3 Second tubular segment
4 Joining section
5 Joining section
6 Joining area
7 Surface structure
8 Axial direction
9 Second direction
10 Longitudinal axis
11 Inner support ring
12 Outer support ring
13 Inner diameter segment
14 Outer diameter segment
15 Deforming force
16 Outer diameter joining section
17 Inner diameter joining section
18 Longitudinal grooves
19 Transverse grooves
20 Angle
21 Step
22 Shoulder
23 - - -
24 Indentation
25 Rotation direction
26 Elevation
27 Inner wall
28 Outer wall
29 Edge area 30 Radial direction
31 First joining surface
32 Second joining surface
33 Sealing surface

The invention claimed is:

1. A welding torch neck assembly comprising:
a first tubular segment (2) having a joining section (4) extending in the axial direction (8), the joining section (4) of the first tubular segment (2) having in the nonjoined state a joining surface (31) having a surface structure (7) with indentations (24) incorporated therein; and
a second tubular segment (3) having a joining section (5) extending in the axial direction (8), the joining section (5) of the second tubular segment (3) having in the nonjoined state a joining surface (32) having a surface structure (7) with indentations (24) incorporated therein, the indentations (24) of the joining section (4) and the indentations (24) of the joining section (5) being at an angle with respect to one another, the joining section (4) of the first tubular segment (2) received within the joining section (5) of the second tubular segment (3), the joining surface (31) directly engaging the joining surface (32), the joining sections (4, 5) overlapping in a joining area (6), the surface structure (7) of at least one of the first joining surface (31) and the second joining surface (32) by virtue of plastic deformation at least partly filling the indentations (24) of the surface structure (7) of the other of the first joining section (4) and the second joining section (5), whereby the first tubular segment (2) and the second tubular segment (3) engage with each other interlocking in both the axial direction (8) and the rotational direction (25.

2. A welding torch neck assembly according to claim 1, characterized in that the surface structure (7) on at least one of two tubular segments (2, 3) and the second tubular segment (3) has intrinsic elastic tension, whereby the two tubular segments (2, 3) lie against one another by an additionally radially acting force closure.

3. A welding torch neck assembly according to claim 1, characterized in that the indentations on the two tubular segments are arranged at uniform distances from each other over the joining surfaces.

4. A welding torch neck assembly according to claim 3, characterized in that the surface structure (7) includes at least one of a knurling, a cross knurling, a thread and a groove structure.

5. A welding torch neck assembly according to claim 3, characterized in that the angle is in the range of 30° to 90°.

6. A welding torch neck assembly according to claim 3, characterized in that:
the indentations (24) of the surface structure (7) on one of the joining surfaces (31, 32) extend at an angle between parallel to the axial direction (8) and 45°, and
the indentations (24) of the surface structure (7) on the other of the joining surfaces (31, 32) extend at an angle between transversely to the axial direction (8) and 45°.

7. A welding torch neck assembly according to claim 1, characterized in that the indentations of the surface structure on one of the joining surfaces extend at an angle between parallel to the axial direction and 45°, and the indentations of the surface structure on the other of the joining surfaces extend at an angle between transversely to the axial direction and 45°.

8. A welding torch neck assembly according to claim 1, characterized in that the two tubular segments (2,3) are rotationally symmetrical at least in the joining sections (4,5).

9. A welding torch neck assembly according to claim 1, further comprising at least one support ring at the joining area, the at least one support ring biasing the joining sections into the joined position.

10. A welding torch neck assembly according to claim 9, characterized in that:
a first support ring (11) engages an inner wall (27) of the first tubular segment (2), and/or
a second support ring (12) engages outer wall (28) of the second tubular segment (3).

* * * * *

UNITED STATES PATENT AND TRADEMARK OFFICE
CERTIFICATE OF CORRECTION

Page 1 of 1

PATENT NO. : 10,919,102 B2
APPLICATION NO. : 15/619710
DATED : February 16, 2021
INVENTOR(S) : Albrecht Reichel, Marco Böhme and Bert Kämmerer It is certified that error appears in the above-identified patent and that said Letters Patent is hereby corrected as shown below:

In the Claims

Column 9, Claim 1, Line 34:
"rotational direction (25." should be -- rotational direction (25). --

Column 10, Claim 3, Lines 2-5:
"indentations on the two tubular segments are arranged at uniform distances from each other over the joining surfaces." should be -- indentations (24) on the two tubular segments (2, 3) are arranged at uniform distances from each other over the joining surfaces (31, 32). --

Column 10, Claim 7, Lines 21-26:
"characterized in that the indentations of the surface structure on one of the joining surfaces extend at an angle between parallel to the axial direction and 45°, and the indentations of the surface structure on the other of the joining surfaces extend at an angle between transversely to the axial direction and 45°." should be -- characterized in that the two tubular segments (2, 3) have different material strengths. --

Column 10, Claim 9, Lines 31-33:
"support ring at the joining area, the at least one support ring biasing the joining sections into the joined position." should be -- support ring (11, 12) at the joining area (6), the at least one support ring biasing the joining sections (4, 5) into the joined position. --

Signed and Sealed this
Eleventh Day of May, 2021

Drew Hirshfeld
*Performing the Functions and Duties of the
Under Secretary of Commerce for Intellectual Property and
Director of the United States Patent and Trademark Office*